(12) United States Patent
Terada

(10) Patent No.: US 10,167,024 B2
(45) Date of Patent: Jan. 1, 2019

(54) PANEL MEMBER, PRESS MOLD, AND MANUFACTURING METHOD OF PANEL MEMBER

(71) Applicant: TOYOTA JIDOSHA KABUSHIKI KAISHA, Toyota-shi, Aichi (JP)

(72) Inventor: Shin Terada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

(21) Appl. No.: 14/898,900

(22) PCT Filed: May 23, 2014

(86) PCT No.: PCT/JP2014/063738
§ 371 (c)(1),
(2) Date: Dec. 16, 2015

(87) PCT Pub. No.: WO2015/001867
PCT Pub. Date: Jan. 8, 2015

(65) Prior Publication Data
US 2016/0368540 A1 Dec. 22, 2016

(30) Foreign Application Priority Data
Jul. 3, 2013 (JP) .................................. 2013-140111

(51) Int. Cl.
*B62D 29/04* (2006.01)
*B29C 43/14* (2006.01)
(Continued)

(52) U.S. Cl.
CPC .......... *B62D 29/043* (2013.01); *B29C 43/021* (2013.01); *B29C 43/14* (2013.01);
(Continued)

(58) Field of Classification Search
CPC ..... Y10T 428/24479; Y10T 428/24612; Y10T 428/24694; B32B 3/28; B62D 29/043;
(Continued)

(56) References Cited

U.S. PATENT DOCUMENTS 4,732,770 A * 3/1988 Welygan ............. B29C 47/0019
425/382 R
5,312,511 A * 5/1994 Fell .......................... B29C 65/10
156/205

(Continued)

FOREIGN PATENT DOCUMENTS

CN 1726128 A 1/2006
DE 60210962 T2 1/2007
(Continued)

OTHER PUBLICATIONS

Office Action dated May 31, 2016, in Japanese Application No. 2015-102157, with English translation.

*Primary Examiner* — Donald J Loney
(74) *Attorney, Agent, or Firm* — Hunton Andrews Kurth LLP

(57) ABSTRACT

The panel member molded from a fiber reinforced plastic material includes the waved plate section. In the waved plate section, lateral wall portions are connected to upright wall portions through bent portions. Each lateral wall portion includes a general portion extending along the wavelength direction of the waved plate section. A plate thickness of the general portions of the lateral wall portions is set thinner than a plate thickness of the upright wall portions. The general portion at least does not include bubbles with a larger diameter than reinforcing fibers. An array direction of the reinforcing fibers disposed in the general portion of the lateral wall portion is set in a direction running along the wavelength direction of the waved plate section.

12 Claims, 13 Drawing Sheets

(51) Int. Cl.
*B29C 43/02* (2006.01)
*B29C 70/46* (2006.01)
*B29D 99/00* (2010.01)
*B62D 25/20* (2006.01)
*B29C 43/36* (2006.01)
*B32B 3/28* (2006.01)
*B62D 29/00* (2006.01)
*B29K 101/12* (2006.01)
*B29K 105/12* (2006.01)
*B29K 307/04* (2006.01)
*B29K 309/08* (2006.01)
*B29L 7/00* (2006.01)
*B29L 31/30* (2006.01)

(52) U.S. Cl.
CPC .............. *B29C 43/36* (2013.01); *B29C 70/46* (2013.01); *B29D 99/0014* (2013.01); *B62D 25/2054* (2013.01); *B29C 2043/022* (2013.01); *B29K 2101/12* (2013.01); *B29K 2105/12* (2013.01); *B29K 2307/04* (2013.01); *B29K 2309/08* (2013.01); *B29L 2007/002* (2013.01); *B29L 2031/30* (2013.01); *B32B 3/28* (2013.01); *B62D 29/005* (2013.01); *Y10T 428/24479* (2015.01); *Y10T 428/24612* (2015.01); *Y10T 428/24694* (2015.01)

(58) Field of Classification Search
CPC ..... B29C 70/46; B29C 43/36; B29D 99/0014; B29K 2105/12
See application file for complete search history.

(56) References Cited

U.S. PATENT DOCUMENTS

| | | | | |
|---|---|---|---|---|
| 5,393,588 | A | * | 2/1995 | Weddendorf ........ B29D 24/002 428/175 |
| 7,132,151 | B2 | * | 11/2006 | Rasmussen ............... B32B 3/28 428/182 |
| 7,901,758 | B2 | * | 3/2011 | Rasmussen ............. B29C 53/28 428/174 |
| 2004/0170810 | A1 | | 9/2004 | Rasmussen |
| 2006/0141215 | A1 | * | 6/2006 | Jonsson .................. B29C 53/26 428/156 |
| 2007/0254120 | A1 | | 11/2007 | Rasmussen |
| 2007/0257402 | A1 | | 11/2007 | Rasmussen |
| 2011/0114249 | A1 | | 5/2011 | Rasmussen |
| 2013/0153130 | A1 | * | 6/2013 | Kitagawa .............. B29C 70/504 156/222 |

FOREIGN PATENT DOCUMENTS

| | | |
|---|---|---|
| JP | S57-141031 U | 9/1982 |
| JP | H05-237938 A | 9/1993 |
| JP | H11-99993 A | 4/1999 |
| JP | 2009-035002 A | 2/2009 |
| JP | 2010-195352 A | 9/2010 |
| JP | 2011-25466 A | 2/2011 |
| JP | 2012-214199 A | 11/2012 |
| JP | 2013-086599 A | 5/2013 |
| WO | 2012/026031 A1 | 3/2012 |

\* cited by examiner

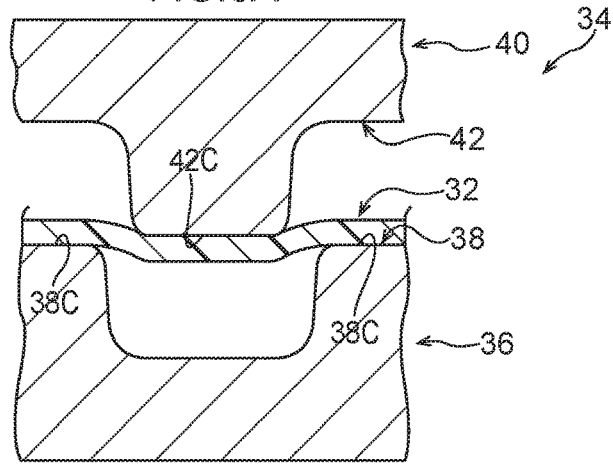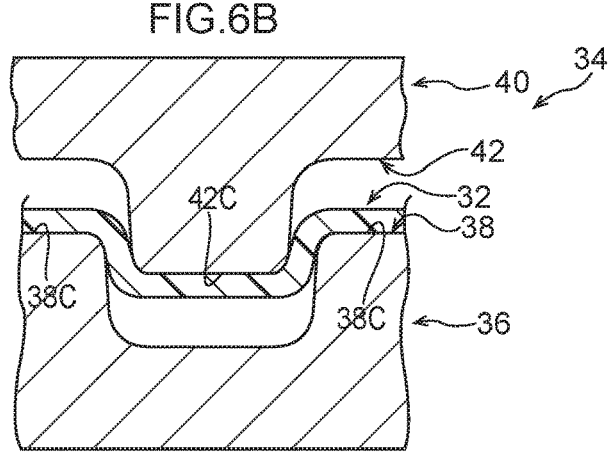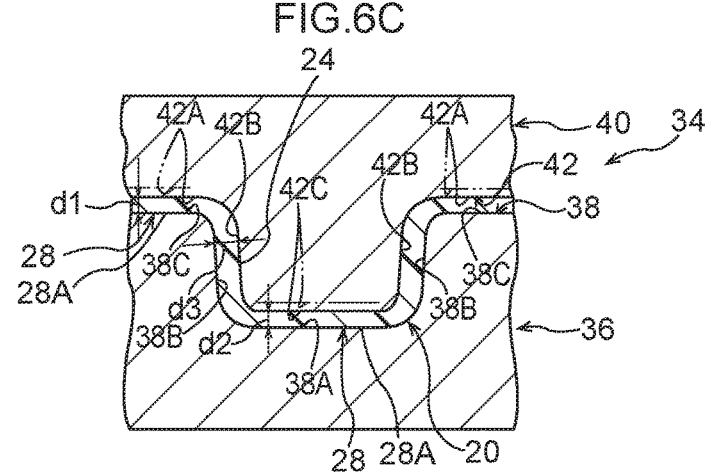

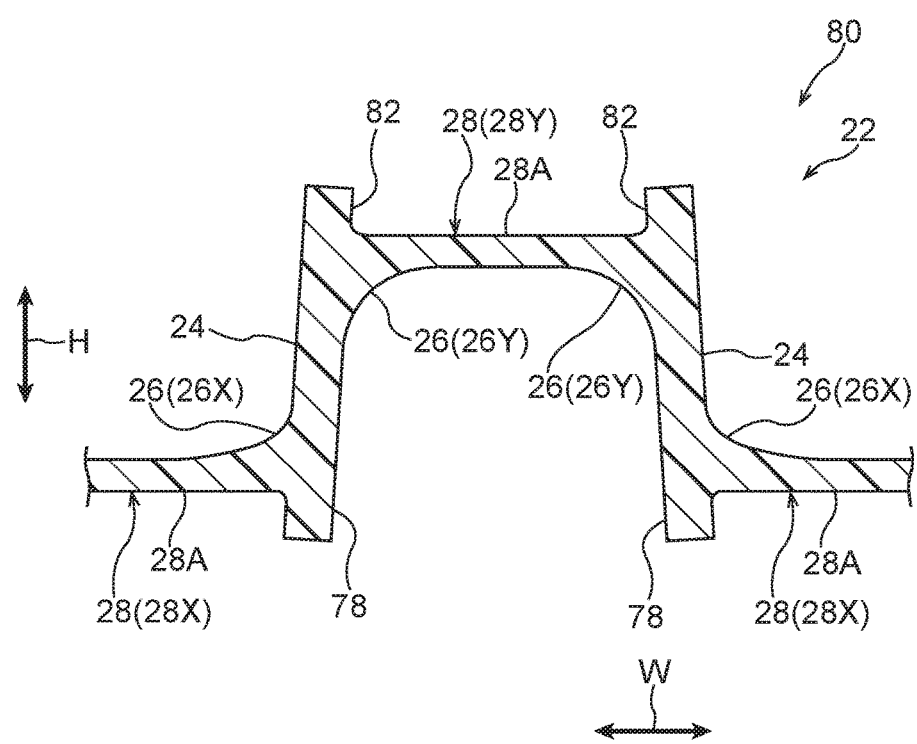

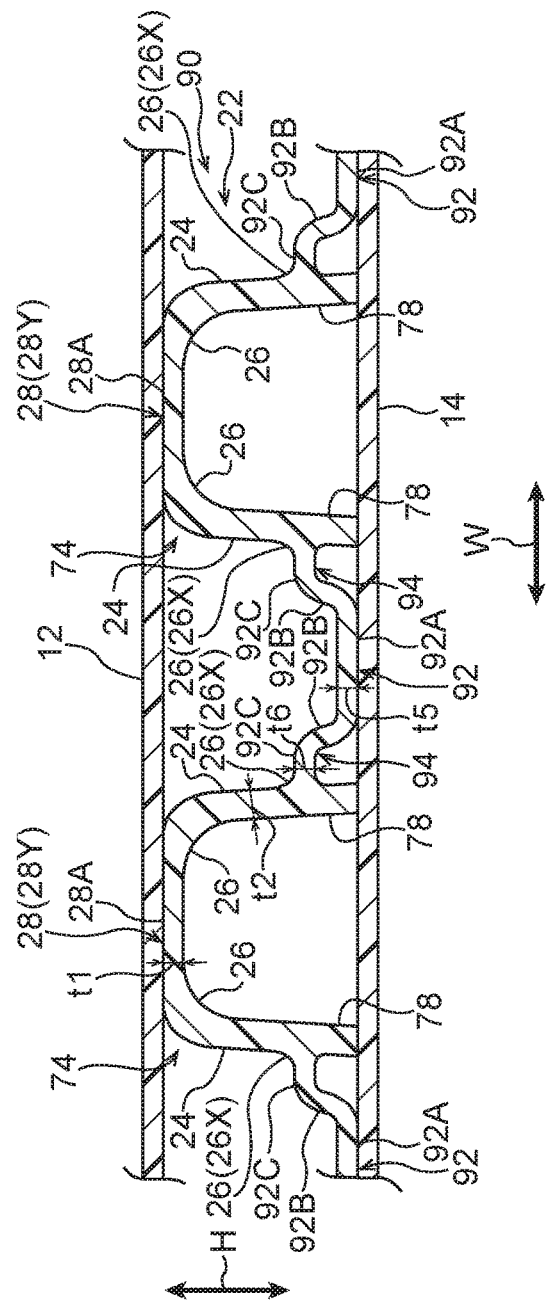

PANEL MEMBER, PRESS MOLD, AND MANUFACTURING METHOD OF PANEL MEMBER

CROSS-REFERENCE TO RELATED APPLICATIONS

This is a national phase application based on the PCT International Patent Application No. PCT/JP2014/063738 filed May 23, 2014, claiming priority to Japanese Patent Application No. 2013-140111 filed Jul. 3, 2013, the entire contents of both of which are incorporated herein by reference.

TECHNICAL FIELD

The present invention relates to a panel member, a press mold, and a manufacturing method of the panel member.

BACKGROUND ART

A panel member formed of a fiber reinforced plastic material and including a waved plate section is sometimes disposed in a vehicle body as a reinforcing member, for example (see, for example, Patent Document 1).

RELATED DOCUMENTS

Related Patent Documents

Patent Document 1: Japanese Patent Application Laid-Open (JP-A) No. 2010-195352

SUMMARY OF INVENTION

Technical Problem

However, there is room for improvement in such background art from the perspective of improving bending rigidity with respect to load in a wavelength direction of the waved plate section.

In consideration of the above circumstances, an object of the present invention is to obtain a panel member capable of improved bending rigidity with respect to load in a wavelength direction of a waved plate section, a press mold employed for press-molding the panel member, and a manufacturing method of the panel member.

Solution to Problem

A panel member according to a first aspect of the present invention includes: first wall portions that form undulations of a waved plate section molded from a fiber reinforced plastic material; and second wall portions that configure upper and lower end portions in a wave height direction of the waved plate section, and that are connected to the first wall portions by bent portions, wherein: the second wall portions each include a general portion extending along a wavelength direction of the waved plate section, the general portions are set with a thinner plate thickness than the first wall portions, and an array direction of reinforcing fibers disposed in the general portions is set in a direction running along the wavelength direction of the waved plate section.

In the above configuration, the panel member includes the waved plate section molded from a fiber reinforced plastic material, and the undulations of the waved plate section are formed by the first wall portions. The upper and lower end portions in the wave height direction of the waved plate section are configured by the second wall portions, and the second wall portions are connected to the first wall portions by the bent portions. The general portions of the second wall portions that extend along the wavelength direction of the waved plate section are set with a thinner plate thickness than the first wall portions, and the array direction of the reinforcing fibers disposed in the general portions is set in a direction running along the wavelength direction of the waved plate section. The panel member is accordingly less liable to undergo bending deformation when load is input in the wavelength direction of the waved plate section.

A second aspect of the present invention is the panel member according to the first aspect, wherein the general portion at least does not include bubbles that have a larger diameter than the reinforcing fibers.

In the above configuration, the general portion at least does not include bubbles that have a larger diameter than the reinforcing fibers, such that, compared to cases in which bubbles with a larger diameter than the reinforcing fibers are included, for example, the density is increased, and the reinforcing fibers can be made to run along the wavelength direction of the waved plate section to the extent that bubbles are not included, as viewed in cross-section along the plate thickness direction. The panel member is accordingly even less liable to undergo bending deformation when load is input in the wavelength direction of the waved plate section.

A third aspect of the present invention is the panel member according to the first aspect or the second aspect, wherein the bent portions are formed in a curved shape and are set with the same plate thickness as the first wall portions; and gradual change portions with gradually decreasing plate thickness on progression away from the bent portions are formed at an end portion at a bent portion side of the second wall portions.

In the above configuration, the bent portions are formed in a curved shape and are set with the same plate thickness as the first wall portions. Load is accordingly well transmitted in cases in which load is transmitted from one side toward the other side in the wave height direction of the waved plate section. The gradual change portions with gradually decreasing plate thickness on progression away from the bent portions are formed at the end portion at the bent portion side of the second wall portions. Localized weakening is thereby suppressed, even though the plate thickness of the second wall portions change.

A fourth aspect of the present invention is the panel member according to the first aspect or the second aspect, wherein the bent portions are formed in a curved shape and are set with the same plate thickness as the second wall portions; and gradual change portions with gradually increasing plate thickness on progression away from the bent portions are formed at an end portion at a bent portion side of the first wall portions.

In the above configuration, the bent portions are formed in a curved shape and are set with the same plate thickness as the second wall portions. This accordingly enables the reinforcing fibers to be further made to run along the bend direction of the bent portion. The gradual change portions with gradually increasing plate thickness on progression away from the bent portions are formed at the end portion at the bent portion side of the first wall portions. Localized weakening is thereby suppressed, even though the plate thickness of the first wall portions change.

A fifth aspect of the present invention is the panel member according to any one of the first aspect to the fourth aspect, wherein extension portions extend out from the bent portions at an opposite side to a first wall portion side, and the extension portions are integrally formed with the bent portions.

In the above configuration, the extension portions extend out from the bent portions at the opposite side to the first wall portion side, and the extension portions are integrally formed at the bent portion. Thus force attempting to flex the bent portion inward, and force attempting to flex an L-shaped portion from the second wall portions to the extension portions inward, both act on the second wall portions contiguous to the bent portion, and these forces cancel each other out. Inward flexing of the bent portions are thereby suppressed.

A press mold according to a sixth aspect of the present invention includes: a lower mold that includes a first molding face employed to press-mold the panel member of any one of the first aspect to the fifth aspect; and an upper mold that is disposed facing an upper side of the lower mold, that includes a second molding face employed to press-mold the panel member, and in which a region of the second molding face that molds the general portions of the second wall portions is set with a narrower gap to the first molding face than a region of the second molding face that molds the first wall portions.

In the above configuration, the upper mold including the second molding face employed to press-mold the panel member is disposed facing the upper side of the lower mold including the first molding face employed to press-mold the panel member. The region of the second molding face of the upper mold that molds the general portion of the second wall portions is set with a narrower gap to the first molding face of the lower mold than the region of the second molding face that molds the first wall portions. Thus, when a fiber reinforced plastic material in sheet form is disposed and press-molded between the upper mold and the lower mold, even the region that is stretched and thinned during molding to form the general portion of the second wall portions can be applied with pressure in the plate thickness direction thereof. The bending rigidity of the general portion of the second wall portions with respect to load in the wavelength direction of the waved plate section is thereby improved.

A manufacturing method of a panel member according to a seventh aspect of the present invention is a manufacturing method of a panel member employing the press mold according to the sixth aspect, and the manufacturing method includes: a first process in which, in a state in which a fiber reinforced plastic material in sheet form is disposed on the lower mold, the second molding face of the upper mold is brought into relatively close contact with the first molding face of the lower mold, and the fiber reinforced plastic material is formed in a waved plate shape; and a second process in which, after the first process, the second molding face of the upper mold is brought into relatively even closer contact with the first molding face of the lower mold, and a region that becomes the general portions of the second wall portions is compressed in a general portion plate thickness direction.

In the above configuration, in the first process, in the state in which the fiber reinforced plastic material in sheet form is disposed on the lower mold, the second molding face of the upper mold is brought into relatively close contact with the first molding face of the lower mold, and the fiber reinforced plastic material is formed in a waved plate shape. In the second process, after the first process, the second molding face of the upper mold is brought into relatively even closer contact with the first molding face of the lower mold, and the region that becomes the general portion of the second wall portions is compressed in the general portion plate thickness direction. In this manner, the region that becomes the general portion of the second wall portions that is stretched and thinned in the first process, is compressed in the plate thickness direction in the second process, such that the density of the general portion of the second wall portions increase.

Advantageous Effects of Invention

As explained above, the panel member according to the first aspect of the present invention includes an excellent advantageous effect of enabling bending rigidity with respect to load in the wavelength direction of the waved plate section to be improved.

The panel member according to the second aspect of the present invention includes an excellent advantageous effect of enabling bending rigidity with respect to load in the wavelength direction of the waved plate section to be further improved.

The panel member according to the third aspect of the present invention includes an excellent advantageous effect of enabling load to be well transmitted in cases in which load is transmitted from one side toward the other side in the wave height direction of the waved plate section, while suppressing localized weakening of the second wall portions.

The panel member according to the fourth aspect of the present invention includes an excellent advantageous effect of enabling bending rigidity of the bent portions with respect to load in the wavelength direction of the waved plate section to be improved due to the array of the reinforcing fibers, while suppressing localized weakening of the first wall portions.

The panel member according to the fifth aspect of the present invention includes an excellent advantageous effect of enabling inward flexing of the bent portions that connect the first wall portions and the second wall portions to be suppressed.

The press mold according to the sixth aspect of the present invention includes an excellent advantageous effect of enabling bending rigidity with respect to load in the wavelength direction of the waved plate section to be improved.

The manufacturing method of a panel member according to the seventh aspect of the present invention includes an excellent advantageous effect of enabling bending rigidity with respect to load in the wavelength direction of the waved plate section to be improved.

BRIEF DESCRIPTION OF DRAWINGS

FIG. 6A is a drawing illustrating an initial stage of a first process of a manufacturing method of the panel member in FIG. 1.

FIG. 6B is a drawing illustrating an intermediate stage of the first process of the manufacturing method of the panel member in FIG. 1.

FIG. 6C is a drawing illustrating a second process of the manufacturing method of the panel member in FIG. 1.

FIG. 12 is a cross-section illustrating a panel member according to a modified example of the fourth exemplary embodiment of the present invention, in a state sectioned along a wavelength direction of a waved plate section.

FIG. 13 is a cross-section illustrating a layered body structure including a panel member according to a fifth exemplary embodiment of the present invention, in a state sectioned along a wavelength direction of a waved plate section.

DESCRIPTION OF EMBODIMENTS

First Exemplary Embodiment

Figure 1:
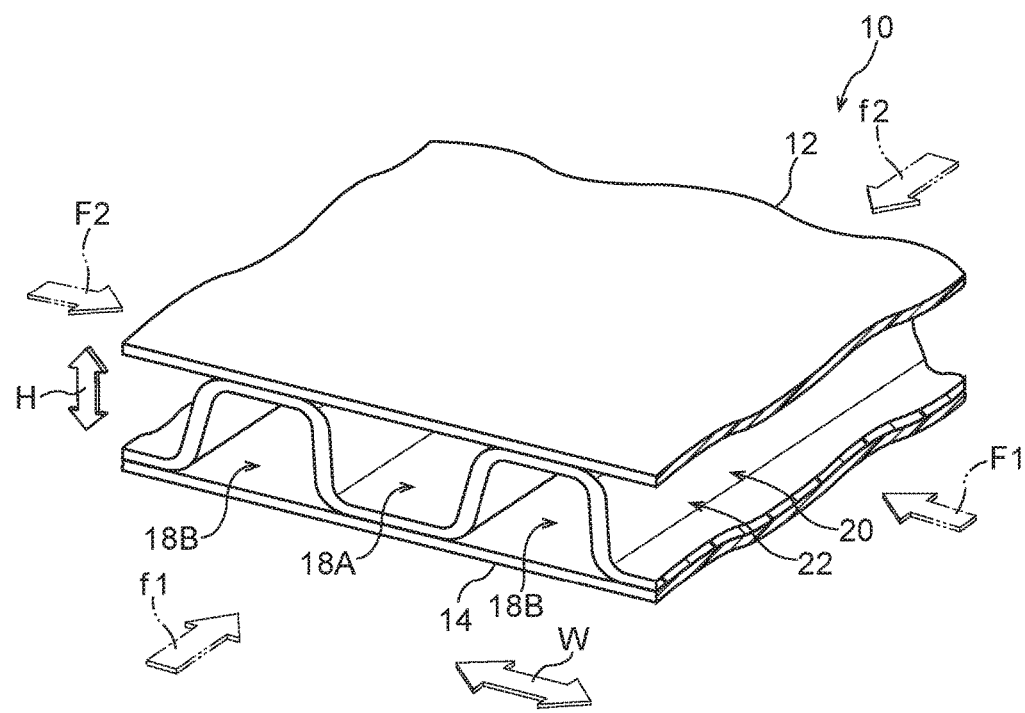
FIG. 1 is a perspective view illustrating a layered body structure including a panel member according to a first exemplary embodiment of the present invention.
Figure 2:
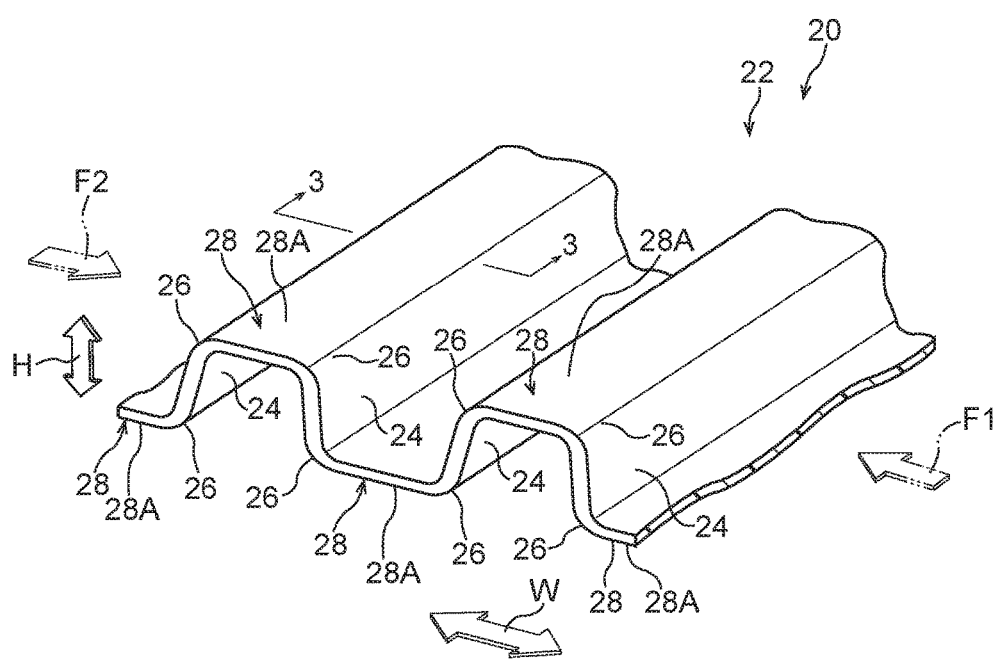
FIG. 2 is a perspective view illustrating the panel member in FIG. 1.
Figure 3:
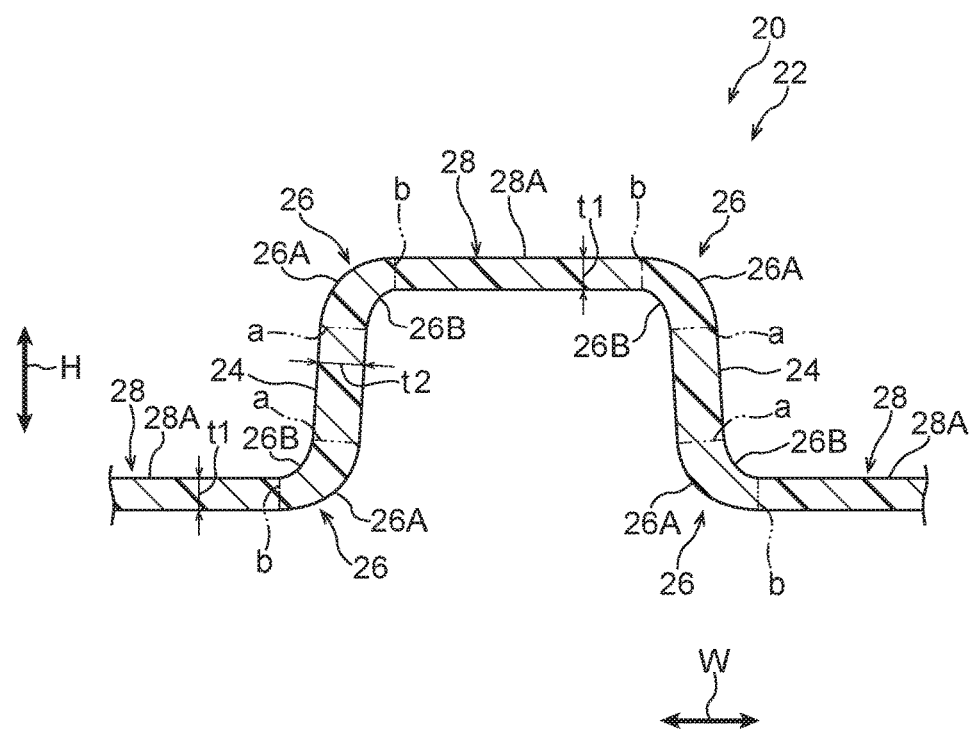
FIG. 3 is an enlarged cross-section taken along line 3-3 in FIG. 2.

Explanation follows regarding a panel member according to a first exemplary embodiment of the present invention, with reference to FIG. 1 to FIG. 4. FIG. 1 is a perspective view illustrating a layered body structure 10 including a panel member 20 according to the present exemplary embodiment. FIG. 2 is a perspective view illustrating the panel member 20, and FIG. 3 is an enlarged cross-section taken along line 3-3 in FIG. 2.

The layered body structure 10 illustrated in FIG. 1 can be applied, for example, to a frame (such as a stack frame that supports a stack unit) disposed at the lower side of a floor panel in a vehicle. Note that in cases in which the layered body structure 10 configures the stack frame, the layered body structure 10 is disposed, for example, such that the arrow W direction runs along the vehicle width direction.

In the layered body structure 10, the waved plate shaped (corrugated shaped) panel member 20 is sandwiched between a flat plate shaped upper panel 12 configuring an upper end section, and a flat plate shaped lower panel 14 configuring a lower end section. The upper panel 12 and the lower panel 14 are, for example, made of resin. However, these panels may also be made of metal. The upper panel 12 and the lower panel 14 are joined (adhered, for example) to the panel member 20. Closed cross-sections 18A are formed by the upper panel 12 and the panel member 20, and closed cross-sections 18B are formed by the lower panel 14 and the panel member 20. The layered body structure 10 is a structure with high rigidity with respect to loads f1, f2 along the extension direction of the closed cross-sections 18A, 18B.

The panel member 20 illustrated in FIG. 2 is molded from a fiber reinforced plastic (FRP) material. The fiber reinforced plastic material is a composite material formed by setting reinforcing fibers, such as carbon fibers or glass fibers, in resin (for example, thermoplastic resin in the present exemplary embodiment). The panel member 20 includes a wave shaped (corrugated shaped) waved plate section 22. The wave height of the waved plate section 22 is set with a sufficient length dimension with respect to the plate thickness of the base material prior to molding (such as double the plate thickness of the base material prior to molding, or greater). The undulations of the waved plate section 22 are formed by upright wall portions 24, each serving as a first wall portion. The upright wall portions 24 slope slightly toward one side or the other side in the wavelength direction of the waved plate section 22 (arrow W direction) on progression toward the upper side in the wave height direction of the waved plate section 22 (arrow H direction). Plural of the upright wall portions 24 are disposed in a row along the wavelength direction of the waved plate section 22 (arrow W direction), with alternating slope directions.

Upper and lower end portions in the wave height direction of the waved plate section 22 (arrow H direction) are configured by lateral wall portions 28, each serving as a second wall portion. The lateral wall portions 28 are connected to the upright wall portions 24 by bent portions 26, and couple together adjacent upright wall portions 24 at the top and bottom alternately. In FIG. 3, boundary lines between the bent portions 26 and the upright wall portions 24 are each illustrated by a double-dotted dashed line a, and boundary lines between the bent portions 26 and the lateral wall portions 28 are each illustrated by a double-dotted dashed line b. Each lateral wall portion 28 includes a flat plate shaped general portion 28A extending along the wavelength direction of the waved plate section 22 (arrow W direction). Note that a range of the lateral wall portion 28 and a range of the general portion 28A of the lateral wall portion 28 are aligned in the drawings.

A plate thickness t1 of the general portions 28A of the lateral wall portions 28 is set thinner than a plate thickness t2 of the upright wall portions 24 (a variable thickness structure is adopted). The bent portion 26 connecting each upright wall portion 24 and lateral wall portion 28 is formed in a curved shape, and has plate thickness that gradually decreases on progression from an end portion at the upright wall portion 24 side toward an end portion at the lateral wall portion 28 side. Namely, the bent portion 26 is a portion with gradually changing plate thickness. In the present exemplary embodiment, as an example, a radial direction outside face 26A of the bent portion 26 is configured by a curved face with a specific radius of curvature, and a radial direction inside face 26B of the bent portion 26 is configured as a curved face with a radius of curvature that gradually increases on progression from the end portion at the upright wall portion 24 side toward the end portion at the lateral wall portion 28 side.

As a modified example, the radial direction inside face (26B) of the bent portion (26) may be configured as a curved face with a specific radius of curvature, and the radial direction outside face (26A) of the bent portion (26) may be configured as a curved face with a radius of curvature that gradually decreases on progression from the end portion at the upright wall portion (24) side toward the end portion at the lateral wall portion (28) side. As another modified example, the radial direction inside face (26B) of the bent portion (26) may be configured as a curved face with a radius of curvature that gradually increases on progression from the end portion at the upright wall portion (24) side toward the end portion at the lateral wall portion (28) side, and the radial direction outside face (26A) of the bent portion (26) may be configured as a curved face with a radius of curvature that gradually decreases on progression from the end portion at the upright wall portion (24) side toward the end portion at the lateral wall portion (28) side.

Figure 4:
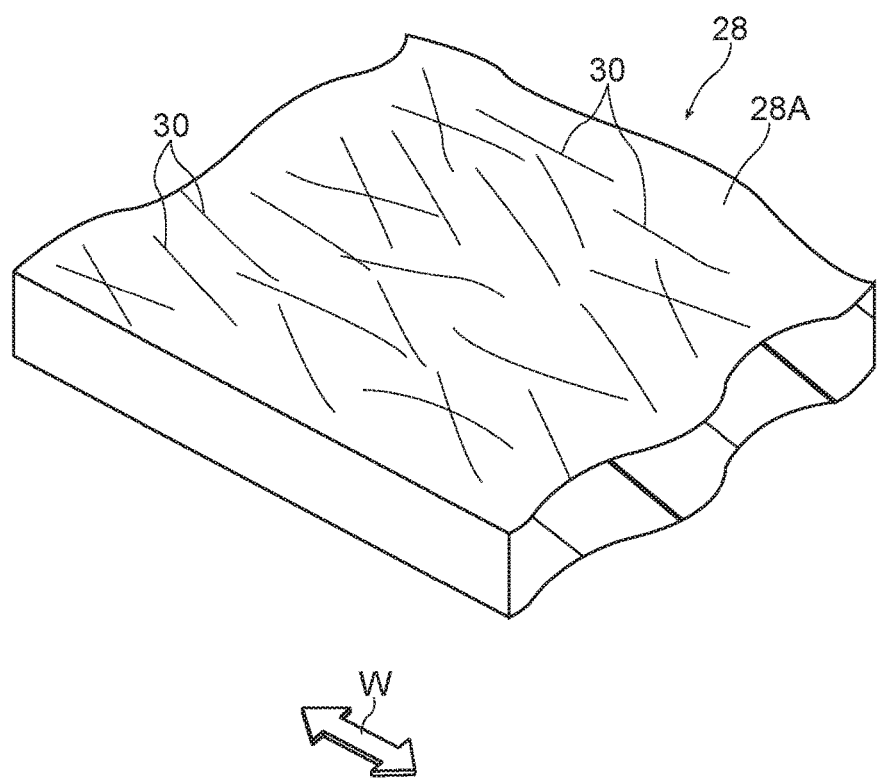
FIG. 4 is a perspective view schematically illustrating an array direction of reinforcing fibers, in a state in which a general portion of the lateral wall portion in FIG. 1 is viewed diagonally from the upper side.

FIG. 4 schematically illustrates an array direction of reinforcing fibers 30 in a state in which the general portion 28A of the lateral wall portion 28 is viewed diagonally from the upper side. FIG. 5B schematically illustrates a cross-section state of the general portion 28A of the lateral wall portion 28, observed in cross-section through an electron microscope from the same direction as FIG. 3. As illustrated in FIG. 5B, the general portion 28A at least does not include bubbles with a larger diameter than the reinforcing fibers 30. Note that it is preferable that the general portion 28A does not include bubbles at all, and the present exemplary embodiment is set thus. As illustrated in FIG. 4 and FIG. 5B, the array direction of the reinforcing fibers 30 disposed in the general portion 28A of the lateral wall portion 28 is set in a direction running along the wavelength direction of the waved plate section 22 (arrow W direction) (see FIG. 2).

Configuration of Press Mold

Explanation follows regarding a press mold 34 for press-molding the panel member 20, with reference to FIG. 6C. As illustrated in FIG. 6C, the press mold 34 is a mold including a lower mold 36 and an upper mold 40.

The lower mold 36 includes a first molding face 38 used for press-molding the panel member 20. The cross-section profile of the first molding face 38 of the lower mold 36 illustrated in FIG. 6C extends along a direction perpendicular to the page surface of FIG. 6C. The first molding face 38 is shaped with peaks and troughs alternating in a row along the left-right direction in FIG. 6C, and includes bottom faces 38A, upright faces 38B, and apex faces 38C. The bottom faces 38A and the apex faces 38C each have a planar face shape and configure region s molding the general portions 28A of the lateral wall portions 28. The upright faces 38B each have a planar face shape and configure region s molding the upright wall portions 24.

The upper mold 40 is disposed facing the upper side of the lower mold 36, and includes a second molding face 42 used for press molding the panel member 20. The cross-section profile of the second molding face 42 of the upper mold 40 illustrated in FIG. 6C extends along the direction perpendicular to the page surface of FIG. 6C. The second molding face 42 is shaped with peaks and troughs alternating in a row along the left-right direction in FIG. 6C, and includes bottom faces 42A, upright faces 42B, and apex faces 42C. The bottom faces 42A and the apex faces 42C each have a planar face shape and configure region s molding the general portions 28A of the lateral wall portions 28. The upright faces 42B each have a planar face shape and configure region s molding the upright wall portions 24.

A distance d1 between the bottom faces 42A of the second molding face 42 of the upper mold 40 and the apex faces 38C of the first molding face 38 of the lower mold 36 is set the same as a distance d2 between the apex faces 42C of the second molding face 42 of the upper mold 40 and the bottom faces 38A of the first molding face 38 of the lower mold 36. The distances d1, d2 are set narrower than a distance d3 between the upright faces 42B of the second molding face 42 of the upper mold 40 and the upright faces 38B of the first molding face 38 of the lower mold 36.

Manufacturing Method, and Operation and Advantageous Effects of Panel Member

Explanation follows regarding operation and advantageous effects of the present exemplary embodiment, while explaining a manufacturing method of the panel member 20 using the press mold 34. The manufacturing method of the panel member 20 is stamp-molding in the present exemplary embodiment, performed in the sequence FIG. 6A, FIG. 6B, FIG. 6C. FIG. 6A illustrates an initial stage of a first process. FIG. 6B illustrates an intermediate stage of the first process, and FIG. 6C illustrates a second process (when mold fastening is completed).

First, as illustrated in FIG. 6A, a fiber reinforced plastic material 32 in sheet form is disposed in a heated state on the lower mold 36. Note that the fiber reinforced plastic material 32 that is the base material is a stampable sheet in which reinforcing fibers are randomly arrayed. As illustrated in FIG. 6A and FIG. 6B, in the first process, in a state in which the fiber reinforced plastic material 32 in sheet form is disposed on the lower mold 36, the second molding face 42 of the upper mold 40 is brought into relatively close contact with the first molding face 38 of the lower mold 36, and the fiber reinforced plastic material 32 is formed in a waved plate shape by pressing. When this is performed, region s of the fiber reinforced plastic material 32 applied with pressure from the apex faces 42C of the second molding face 42 of the upper mold 40, and region s of the fiber reinforced plastic material 32 applied with pressure from the apex faces 38C of the first molding face 38 of the lower mold 36, are stretched such that the plate thickness becomes thinner. Reinforcing fibers in the stretched region s are arrayed along the stretched direction. Note that the double-dotted dashed lines in FIG. 6C illustrate positions of the bottom faces 42A and the apex faces 42C of the upper mold 40 when the first process is complete.

Figure 5A:
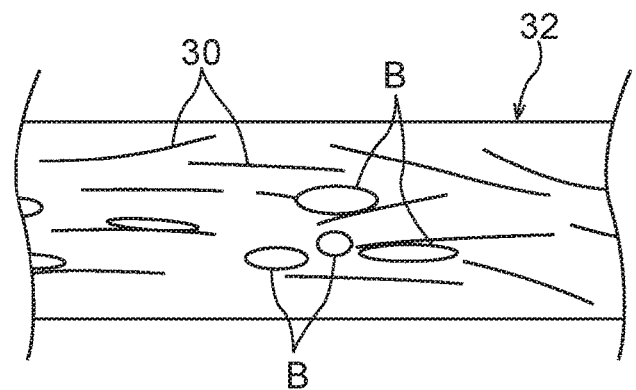
FIG. 5A is a vertical cross-section schematically illustrating a cross-section state of a region that will become a general portion of a lateral wall portion directly prior to a second process.
Figure 5B:
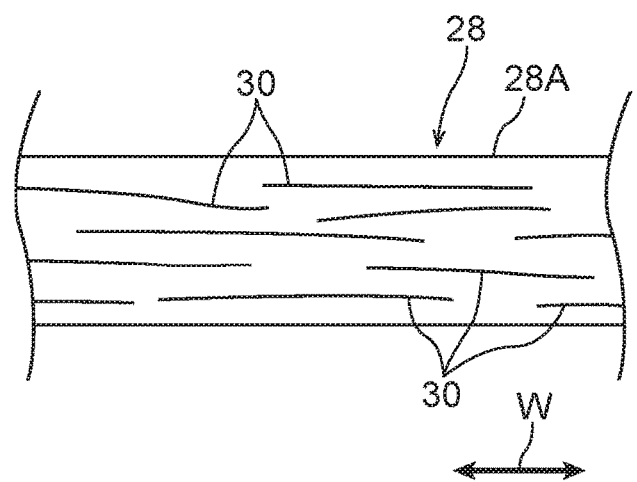
FIG. 5B is a vertical cross-section schematically illustrating a cross-section state of a general portion of a lateral wall portion.

FIG. 5A is a schematic drawing illustrating a state of a region that will become the general portion 28A of the lateral wall portion 28 (see FIG. 5B) directly prior to the second process, observed in cross-section using an electron microscope from the same direction as FIG. 6A to FIG. 6C. As illustrated in FIG. 5A, the region that will become the general portion 28A of the lateral wall portion 28 (see FIG. 5B) includes bubbles B with a larger diameter than the reinforcing fibers 30.

Next, as illustrated in FIG. 6C, in the second process following the first process, the second molding face 42 of the upper mold 40 is brought into relatively even closer contact with the first molding face 38 of the lower mold 36, and each region that will become the general portion 28A of the lateral wall portion 28 is compressed along the plate thickness direction thereof. The pressure difference in the press mold 34 between the pressure for molding the general portion 28A of the lateral wall portion 28 and the pressure for molding other portions is thereby reduced, and molding defects are suppressed. As illustrated in FIG. 5B, the density of the region that will become the general portion 28A of the lateral wall portion 28 increases, and the bubbles B (see FIG. 5A) disappear. Since the general portion 28A of the lateral wall portion 28 does not include the bubbles B (see FIG. 5A), the array direction of the reinforcing fibers 30 is further made to run along the wavelength direction (arrow W direction) of the waved plate section 22 (see FIG. 2) when viewed in cross-section sectioned along the plate thickness direction of the general portion 28A.

The panel member 20 illustrated in FIG. 2 that has been manufactured in this manner has increased bending strength and bending rigidity at the general portion 28A of each lateral wall portion 28 against the loads F1, F2 in the wavelength direction of the waved plate section 22 (arrow W direction), and the general portion 28A of the lateral wall portion 28 is less liable to buckle under the loads F1, F2. Namely, the general portion 28A of the lateral wall portion 28 is sufficiently applied with pressure from the press mold 34 (see FIG. 6A to FIG. 6C), thereby enabling the original material strength (or a similar strength thereto) of the fiber reinforced plastic material 32 (see FIG. 6A and FIG. 6B) to be exhibited. As a result, when the loads F1, F2 are input to the panel member 20 in the wavelength direction of the waved plate section 22 (arrow W direction), the panel member 20 according to the present exemplary embodiment is less liable to undergo bending deformation than, for example, a panel member according to a comparative example in which bubbles with a larger diameter than the reinforcing fibers are included in general portions at upper and lower end portions in the wave height direction (arrow H direction) of a waved plate section (22), and the array of the reinforcing fibers is random.

As explained above, the panel member 20, the press mold 34 (see FIG. 6A to FIG. 6C), and the manufacturing method of the panel member 20 according to the present exemplary embodiment enables the bending rigidity against the load F in the wavelength direction of the waved plate section 22 (arrow W direction) to be increased. Increasing the bending rigidity enables a similar degree of bending rigidity to be obtained compared to a comparative structure in which an inner portion at a region corresponding to the general portion 28A of the lateral wall portion 28 is in a state resembling that illustrated in FIG. 5A, while enabling the required mass to be reduced.

Second Exemplary Embodiment

Figure 7:
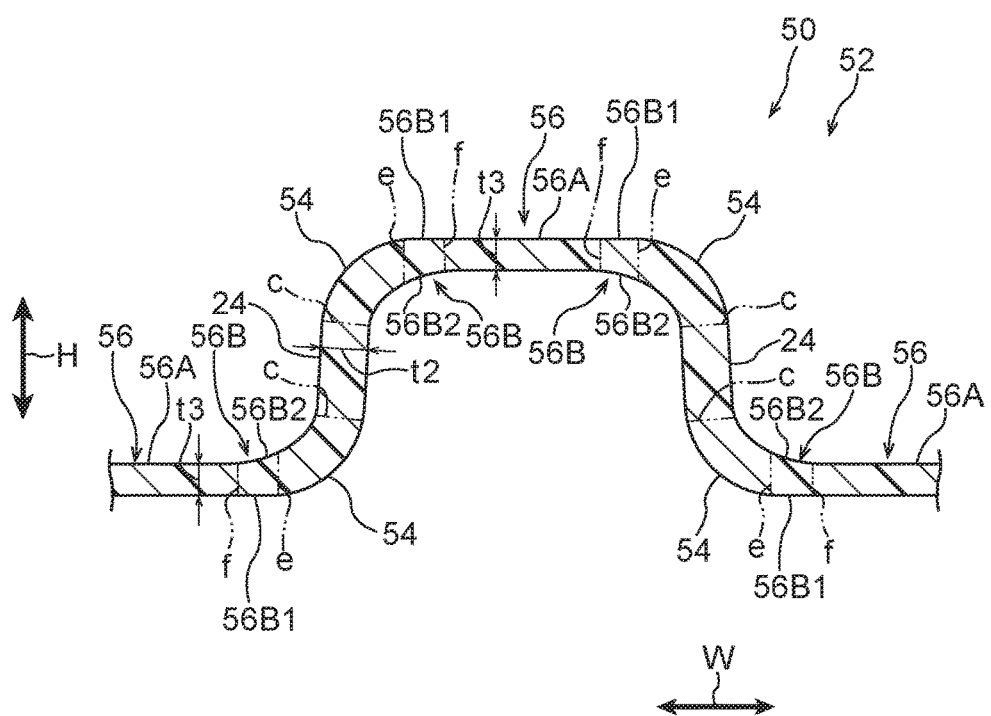
FIG. 7 is a cross-section illustrating a panel member according to a second exemplary embodiment of the present invention, in a state sectioned along a wavelength direction of a waved plate section.

Explanation follows regarding a second exemplary embodiment of the present invention, with reference to FIG. 7. FIG. 7 is a cross-section (a drawing corresponding to the first exemplary embodiment in FIG. 3) of a panel member 50 according to the present exemplary embodiment. As illustrated in FIG. 7, the panel member 50 differs from the panel member 20 according to the present exemplary embodiment (see FIG. 3, etc.) in the respect that gradual change portions 56B are provided to lateral wall portions 56, without providing gradual change portions to bent portions 54. Other configuration has substantially the same configuration as in the first exemplary embodiment. Configuration portions that are basically the same as in the first exemplary embodiment are accordingly appended with the same reference numerals, and explanation thereof is omitted.

The panel member 50 illustrated in FIG. 7 is molded from a similar fiber reinforced plastic material to the panel member 20 of the first exemplary embodiment (see FIG. 3, etc.), and includes a waved plate section 52. The undulations of the waved plate section 52 are formed by the upright wall portions 24.

Upper and lower end portions in the wave height direction of the waved plate section 52 (arrow H direction) are configured by the lateral wall portions 56, each serving as a second wall portion. The lateral wall portions 56 are connected to the upright wall portions 24 by the bent portions 54, and couple together adjacent upright wall portions 24 at the top and bottom alternately. Each lateral wall portion 56 includes a flat plate shaped general portion 56A extending along the wavelength direction of the waved plate section 52 (arrow W direction).

A plate thickness t3 of the general portions 56A of the lateral wall portions 56 is set thinner than the plate thickness t2 of the upright wall portions 24. The general portion 56A of the lateral wall portion 56 is applied with pressure during molding, and at least does not include bubbles with a larger diameter than the reinforcing fibers. Note that it is preferable that the general portion 56A does not include any bubbles at all, and the present exemplary embodiment is set thus. The array direction of the reinforcing fibers disposed in the general portion 56A of the lateral wall portion 56 is set in a direction running along the wavelength direction of the waved plate section 52 (arrow W direction).

The bent portions 54 connecting the upright wall portions 24 and the lateral wall portions 56 are each formed in a curved shape and are set with a similar plate thickness to the upright wall portions 24. In FIG. 7, boundary lines between the bent portions 54 and the upright wall portions 24 are each illustrated by a double-dotted dashed line c, and boundary lines between the bent portions 54 and the lateral wall portions 56 are each illustrated by a double-dotted dashed line e. The gradual change portions 56B with gradually decreasing plate thickness on progression away from the bent portion 54 are formed at end portions at the bent portion 54 sides of each lateral wall portion 56. In other words, the general portion 56A of the lateral wall portion 56 is connected to the bent portion 54 through the gradual change portion 56B. In FIG. 7, boundary lines between the gradual change portions 56B and the general portions 56A are each illustrated by a double-dotted dashed line f.

In each gradual change portion 56B, an outer face 56B1 contiguous to a radial direction outside face of the bent portion 54 is formed in the same plane as a face of the general portion 56A of the adjacent lateral wall portion 56. In each gradual change portion 56B, an inner face 56B2 contiguous to a radial direction inside face of the bent portion 54 slopes in a direction that gradually approaches the outer face 56B 1 side on progression from an end portion at the bent portion 54 side toward an end portion at the general portion 56A side of the lateral wall portion 56.

Although not illustrated in the drawings, a press mold for press-molding the panel member 50 includes a lower mold and an upper mold. The lower mold includes a first molding face employed to press-mold the panel member 50. The upper mold includes a second molding face that is disposed facing the upper side of the lower mold and is employed to press-mold the panel member 50. Each region of the second molding face of the upper mold that molds the general portions 56A of the lateral wall portion 56 is set with a narrower gap to the first molding face of the lower mold than a region of the second molding face that molds the upright wall portions 24. A manufacturing method of the panel member 50 employing such a press mold is performed by a similar sequence to that in the first exemplary embodiment.

The configuration of the present exemplary embodiment explained above enables similar operation and advantageous effects to those previously described in the first exemplary embodiment to be obtained. Moreover, since the bent portions 54 are formed in curved shapes and are set with a similar plate thickness to the upright wall portions 24, load is well transmitted when load is transmitted from one side toward the other side in the wave height direction of the waved plate section 52 (arrow W direction). When the panel member 50 is sandwiched between the upper panel 12 and the lower panel 14, similarly to the panel member 20 of the first exemplary embodiment illustrated in FIG. 1, for example, there is good load transmission (propagation) performance between the upper panel 12 and the lower panel 14. Moreover, since the gradual change portions 56B, rather than rapid change portions, are formed at the end portions at the bent portion 54 sides of the lateral wall portions 56 illustrated in FIG. 7, localized weakening is suppressed, even though the plate thickness of the lateral wall portions 56 changes.

Third Exemplary Embodiment

Figure 8:
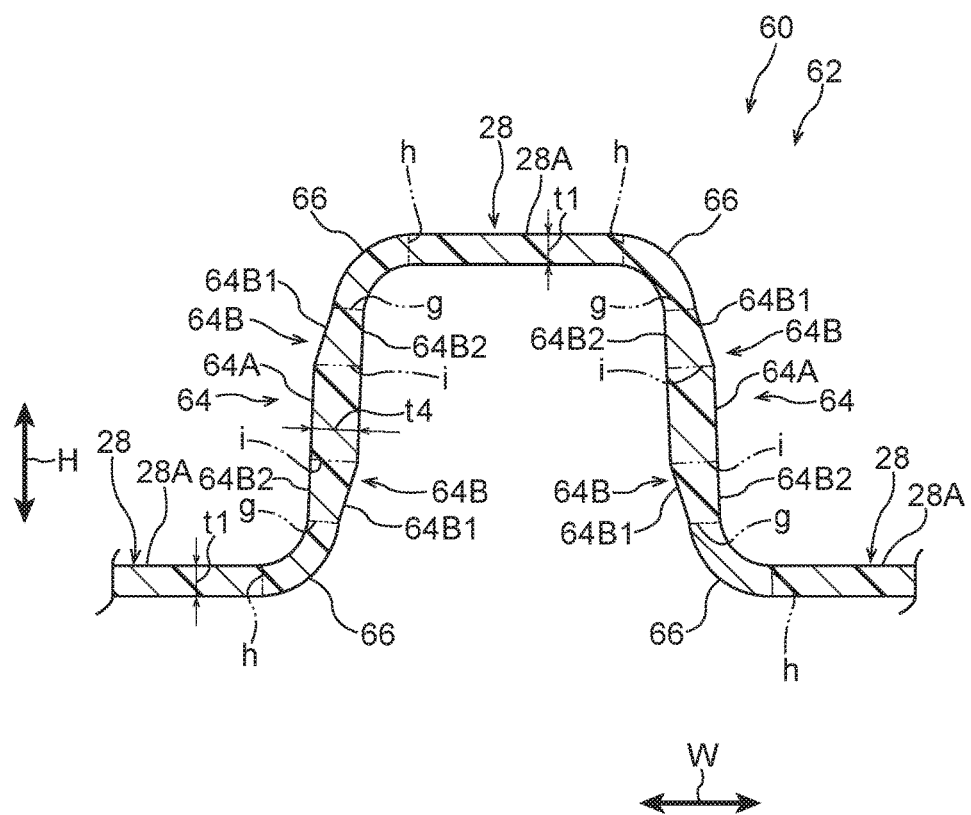
FIG. 8 is a cross-section illustrating a panel member according to a third exemplary embodiment of the present invention, in a state sectioned along a wavelength direction of a waved plate section.

Explanation follows regarding a third exemplary embodiment of the present invention, with reference to FIG. 8. FIG. 8 is a cross-section (a drawing corresponding to the first exemplary embodiment in FIG. 3) of a panel member 60 according to the present exemplary embodiment. As illustrated in FIG. 8, the panel member 60 differs from the panel member 20 according to the first exemplary embodiment (see FIG. 3, etc.) in the respect that gradual change portions 64B are provided to upright wall portions 64, without providing gradual change portions to bent portions 66. Other configuration has basically the same configuration as that in the first exemplary embodiment. Configuration portions that are basically the same as those in the first exemplary embodiment are accordingly appended with the same reference numerals, and explanation thereof is omitted.

The panel member 60 illustrated in FIG. 8 is molded from a similar fiber reinforced plastic material to the panel member 20 of the first exemplary embodiment (see FIG. 3, etc.), and includes a waved plate section 62. The undulations of the waved plate section 62 are formed by the upright wall portions 64, each serving as a first wall portion. The upright wall portion 64 is basically the same configuration portion as the upright wall portion 24 of the first exemplary embodiment, excluding the points described below.

Upper and lower end portions in the wave height direction of the waved plate section 62 (arrow H direction) are configured by the lateral wall portions 28. The lateral wall portions 28 are connected to the upright wall portions 64 by the bent portions 66, and couple together adjacent upright wall portions 64 at the top and bottom alternately. The plate thickness t1 the general portions 28A of the lateral wall portions 28 is set thinner than a plate thickness t4 of general portions 64A of the upright wall portions 64 (region s other than the gradual change portions 64B, described below). The general portion 28A of each lateral wall portion 28 is applied with pressure during molding, and at least does not include bubbles with a larger diameter than the reinforcing fibers. Note that it is preferable that the general portion 28A does not include bubbles at all, and the present exemplary embodiment is set thus. The array direction of the reinforcing fibers disposed in the general portion 28A of the lateral wall portion 28 is set in a direction running along the wavelength direction of the waved plate section 62 (arrow W direction).

The bent portions 66 connecting the upright wall portions 64 and the lateral wall portions 28 are each formed in a curved shape and are set with a similar plate thickness to the lateral wall portions 28. In FIG. 8, boundary lines between the bent portions 66 and the upright wall portions 64 are each illustrated by a double-dotted dashed line g, and boundary lines between the bent portions 66 and the lateral wall portions 28 are each illustrated by a double-dotted dashed line h. The gradual change portions 64B with gradually increasing plate thickness on progression away from the bent portions 66 are formed at end portions at the bent portion 66 sides of each upright wall portion 64. In other words, the general portion 64A of the upright wall portion 64 is connected to the bent portions 66 through the gradual change portions 64B. In FIG. 8, boundary lines between the gradual change portions 64B and the general portions 64A are each illustrated by a double-dotted dashed line i.

In each gradual change portion 64B, a face 64B2 contiguous to a radial direction inside face of the bent portion 66 is formed in the same plane as a face of the general portion 64A of the adjacent upright wall portion 64. In each gradual change portion 64B, a face 64B1 contiguous to a radial direction outside face of the bent portion 66 slopes in a direction that gradually moves away from the face 64B2 side, this being the opposing face, on progression from the end portion at the bent portion 66 side toward the end portion at the general portion 64A side of the upright wall portion 64.

Although not illustrated in the drawings, a press mold for press-molding the panel member 60 includes a lower mold and an upper mold. The lower mold includes a first molding face employed to press-mold the panel member 60. The upper mold includes a second molding face that is disposed facing the upper side of the lower mold and is employed to press-mold the panel member 60. Each region of the second molding face of the upper mold that molds the general portions 28A of the lateral wall portions 28 is set with a narrower gap to the first molding face of the lower mold than a region of the second molding face that molds the upright wall portions 64 (general portions 64A). A manufacturing method of the panel member 60 employing such a press mold is performed by a similar sequence to that in the first exemplary embodiment.

The configuration of the present exemplary embodiment explained above obtains similar operation and advantageous effects to those previously described in the first exemplary embodiment. Moreover, since the bent portions 66 are formed in curved shapes and are set with a similar plate thickness to the lateral wall portions 28 in the present exemplary embodiment, the reinforcing fibers can be further made to run along the bend direction of the bent portions 66. Moreover, since the gradual change portions 64B are formed at the end portions at the bent portion 66 sides of each upright wall portion 64, localized weakening is suppressed, even though the plate thickness of the upright wall portion 64 changes.

Fourth Exemplary Embodiment

Figure 9:
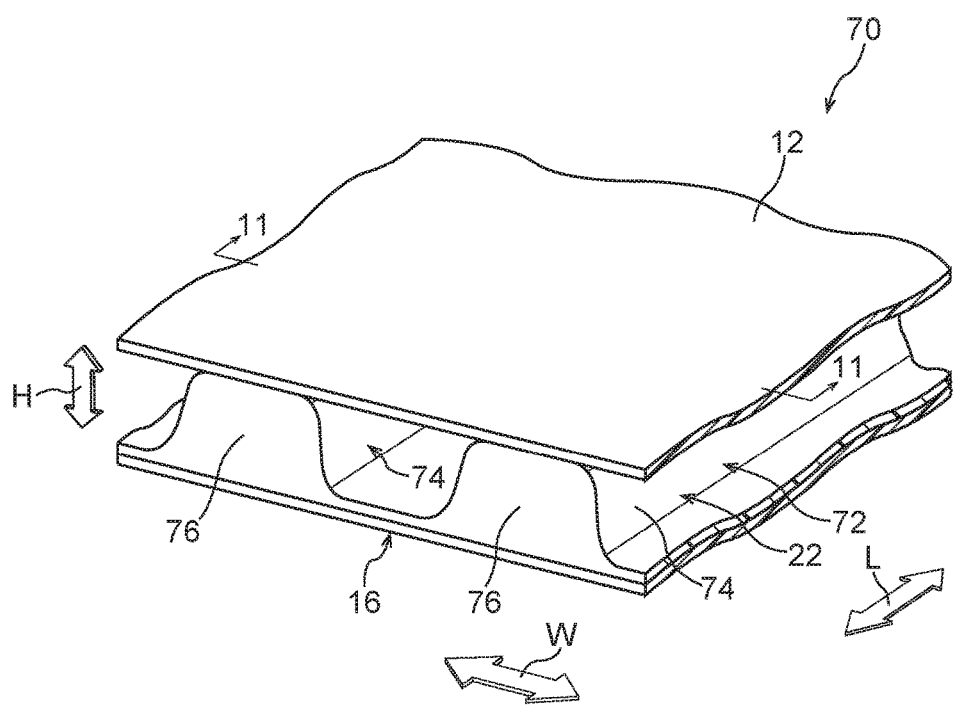
FIG. 9 is a perspective view illustrating a layered body structure including a panel member according to a fourth exemplary embodiment of the present invention.
Figure 10:
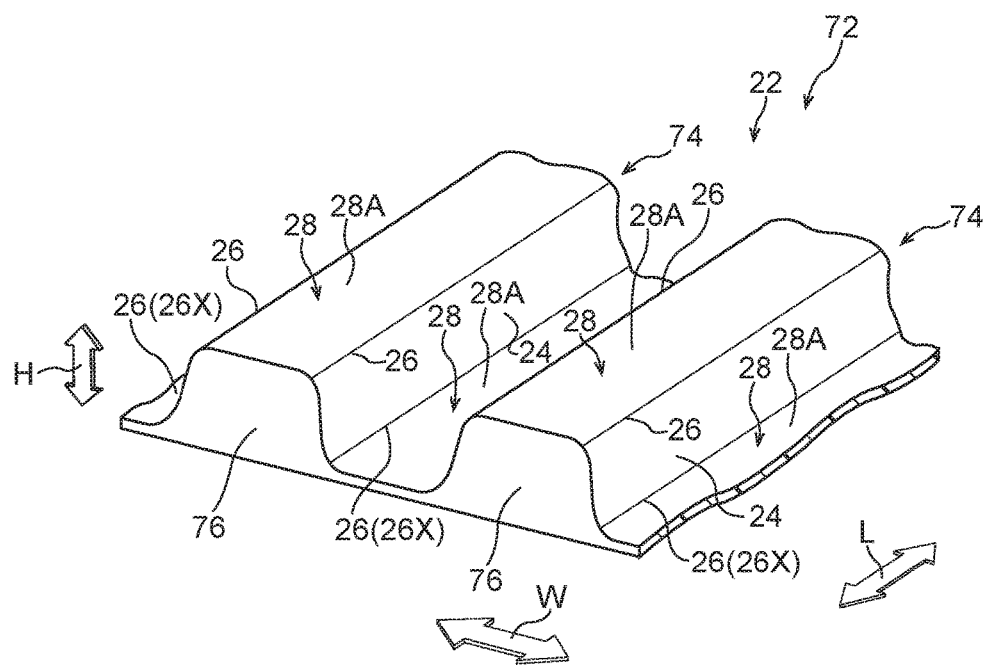
FIG. 10 is a perspective view illustrating the panel member in FIG. 9.
Figure 11:
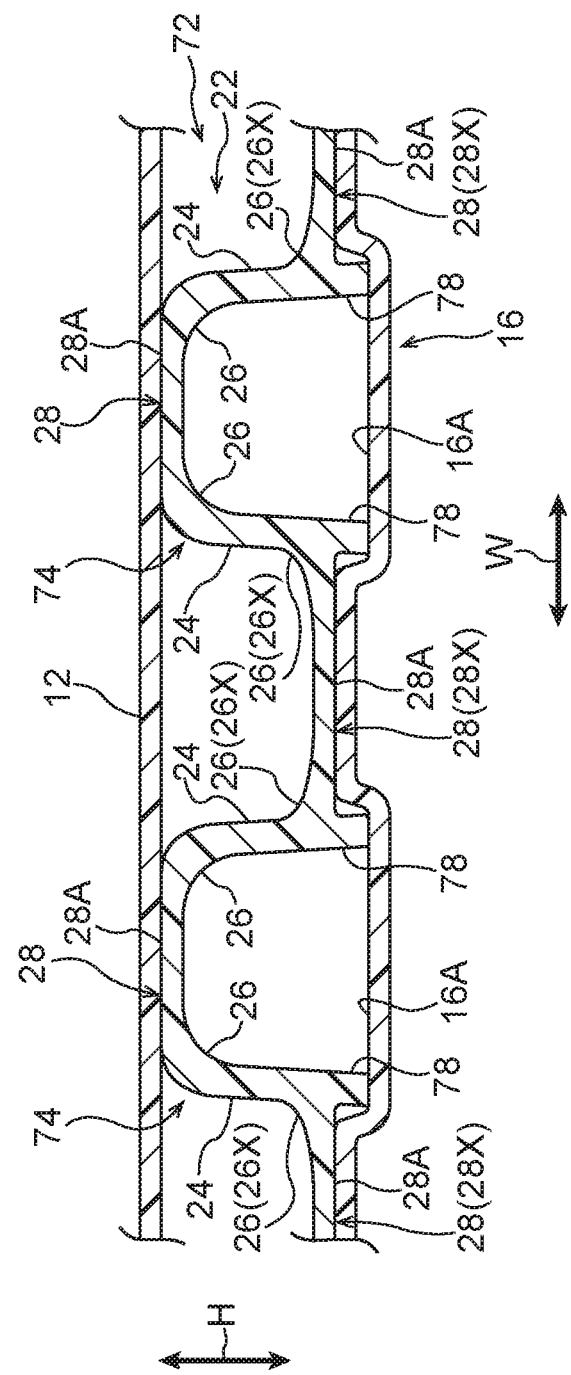
FIG. 11 is an enlarged cross-section taken along line 11-11 in FIG. 9.

Explanation follows regarding a fourth exemplary embodiment of the present invention, with reference to FIG. 9 to FIG. 11. FIG. 9 is a perspective view illustrating a layered body structure 70 including a panel member 72 according to the present exemplary embodiment. FIG. 10 is a perspective view illustrating the panel member 72, and FIG. 11 is an enlarged cross-section taken along line 11-11 in FIG. 9. The present exemplary embodiment has basically the same configuration as that in the first exemplary embodiment, with the exception of the points explained below. Configuration portions that are basically the same as those in the first exemplary embodiment are accordingly appended with the same reference numerals, and explanation thereof is omitted.

As illustrated in FIG. 9, the wave shaped (corrugated shaped) panel member 72 is sandwiched between the upper panel 12 configuring an upper end section, and a lower panel 16 configuring a lower end section of the layered body structure 70. The lower panel 16 has a similar configuration to the lower panel 14 of the first exemplary embodiment (see FIG. 1), except in the respect that recess groove portions 16A (see FIG. 11), described later, are formed thereto. The panel member 72 has a similar configuration to the panel member 20 of the first exemplary embodiment (see FIG. 1 to FIG. 3), with the exception of the points explained below.

As illustrated in FIG. 9 and FIG. 10, the panel member 72 is formed with closed wall portions 76 at both end portions in the extension direction of rib portions 74 (arrow L direction), each formed in a shape protruding toward the upper side. The closed wall portions 76 configure upright wall portions that close off both sides in the extension direction of the rib portions 74 (arrow L direction). Note that the extension direction of the rib portions 74 (arrow L direction) is a direction that is orthogonal to the wavelength direction of the waved plate section 22 (arrow W direction), and is also orthogonal to the wave height direction of the waved plate section 22 (arrow H direction).

As illustrated in FIG. 11, an extension portion 78 extends out at the opposite side to the upright wall portion 24 side from each bent portion 26 (26X) that connects a region of the lateral wall portion 28 forming a lower wall portion (lateral wall portion 28 (28X)) and the upright wall portion 24. The extension portion 78 is integrally formed at the bent portion 26 (26X) at a base side thereof, and extends along the extension direction of the rib portion 74 (the direction perpendicular to the page face in FIG. 11). The recess groove portions 16A that correspond to the respective rib portions 74 are formed at the lower panel 16. A pair of the extension portions 78 formed below the respective rib portions 74 enter the respective recess groove portions 16A.

Although not illustrated in the drawings, a press mold for press-molding the panel member 72 includes a lower mold and an upper mold. The lower mold includes a first molding face employed to press-mold the panel member 72. The upper mold includes a second molding face that is disposed facing the upper side of the lower mold and is employed to press-mold the panel member 72. Each region of the second molding face of the upper mold that molds the general portions 28A of the lateral wall portions 28 is set with a narrower gap to the first molding face of the lower mold than a region of the second molding face that molds the upright wall portions 24. A manufacturing method of the panel member 72 employing such a press mold is performed by a similar sequence to that in the first exemplary embodiment.

The configuration of the present exemplary embodiment obtains similar operation and advantageous effects to those previously described in the first exemplary embodiment. Moreover, an inward flexing force that is caused by anisotropic reinforcing fibers and attempts to reduce the obtuse angle of the bent portion 26 (26X) acts on each bent portion 26 (26X); however, the present exemplary embodiment enables this to be suppressed. Namely, force attempting to flex the bent portion 26 (26X) inward, and force attempting to flex an L-shaped portion from the lateral wall portion 28 (28X) to the extension portion 78 inward, both act on the lateral wall portion 28 (28X) contiguous to the bent portion 26 (26X), and these forces cancel each other out. Inward flexing of the bent portion 26 (26X) is thereby suppressed, and the dimension accuracy at the bent portion 26 (26X) is improved. This accordingly prevents or effectively suppresses the lateral wall portion 28 (28X) from moving away from a contact face with the lower panel 16.

Modified Example of Fourth Exemplary Embodiment

Explanation follows regarding a modified example of the panel member 72 of the fourth exemplary embodiment. FIG. 12 illustrates the modified example of the panel member 72 of the fourth exemplary embodiment. Note that configuration portions similar to those in the panel member 72 are appended with the same reference numerals, and explanation thereof is omitted.

As illustrated in FIG. 12, in a panel member 80, an extension portion 82 also extends out at the opposite side to the upright wall portion 24 side from each bent portion 26 (26Y) that connects the lateral wall portion 28 (28Y) out of the lateral wall portions 28 that forms an upper wall portion, and the upright wall portion 24. A base side of the extension portion 82 is integrally formed at the bent portion 26 (26Y).

This configuration also obtains the operation and advantageous effects in the fourth exemplary embodiment. Moreover, an inward flexing force that is caused by anisotropic reinforcing fibers and attempts to reduce the obtuse angle of the bent portion 26 (26Y) acts on each bent portion 26 (26Y); however, the present exemplary embodiment enables this to be suppressed. Namely, force attempting to flex the bent portion 26 (26Y) inward, and force attempting to flex an L-shaped portion from the lateral wall portion 28 (28Y) to the extension portion 82 inward, both act on the lateral wall portion 28 (28Y) contiguous to the bent portion 26 (26Y), and these forces cancel each other out. Inward flexing of the bent portion 26 (26Y) is thereby suppressed, and the dimension accuracy at the bent portion 26 (26Y) is improved.

Fifth Exemplary Embodiment

Explanation follows regarding a fifth exemplary embodiment of the present invention, with reference to FIG. 13. FIG. 13 is a cross-section (a drawing corresponding to the fourth exemplary embodiment in FIG. 11) of a panel member 90 according to the present exemplary embodiment in a state sectioned along the wavelength direction of the waved plate section 22 (arrow W direction). The present exemplary embodiment has basically the same configuration as that in the fourth exemplary embodiment, with the exception of the points explained below. Configuration portions of the present exemplary embodiment that are basically the same as those in the first or fourth exemplary embodiments are accordingly appended with the same reference numerals, and explanation thereof is omitted.

As illustrated in FIG. 13, the panel member 90 of the present exemplary embodiment is formed with lower wall portions 92, each serving as a second wall portion, instead of the lateral wall portions 28 (28X) (see FIG. 11) configuring the lower wall portions of the fourth exemplary embodiment. Note that the lateral wall portions 28 (28Y) configuring the upper wall portions of the panel member 90 are formed similarly to in the fourth exemplary embodiment. Each lower wall portion 92 configures a lower end portion in the wave height direction of the waved plate section 22 (arrow H direction) and is connected to the upright wall portions 24 through the bent portions 26 (26X).

Each lower wall portion 92 includes a flat plate shaped general portion 92A that is adhered to the lower panel 14 in a face-to-face contact state. Each general portion 92A extends along the wavelength direction of the waved plate section 22 (arrow W direction). A plate thickness $t5$ of the general portions 92A is set the same as the plate thickness $t1$ of the lateral wall portions 28 (28Y) configuring the upper wall portions, and thinner than the plate thickness t2 of the upright wall portions 24. The general portions 92A are applied with pressure during molding, and at least do not include bubbles with a larger diameter than the reinforcing fibers. Note that it is preferable that the general portion 92A does not include bubbles at all, and the present exemplary embodiment is set thus. The array direction of the reinforcing fibers disposed in the general portion 92A is set in a direction running along the wavelength direction of the waved plate section 22 (arrow W direction).

A lower face of each general portion 92A is set in the same plane as a lower face of the extension portion 78. End portions at the extension portion 78 sides of the general portion 92A are disposed with slight gaps to the extension portions 78.

Each lower wall portion 92 includes shelf portions 92C that are contiguously formed at the bent portions 26 (26X). Each shelf portion 92C is formed at the upper side of a space between the general portion 92A and the extension portion 78 and is disposed parallel to the lower panel 14. Namely, the shelf portion 92C also extends along the wavelength direction of the waved plate section 22 (arrow W direction). In the present exemplary embodiment, a plate thickness t6 of the shelf portions 92C is set the same as the plate thickness t5 of the general portions 92A, and thinner than the plate thickness t2 of the upright wall portions 24. The shelf portions 92C are applied with pressure during molding, and at least do not include bubbles with a larger diameter than the reinforcing fibers. Note that it is preferable that the shelf portions 92C do not include bubbles at all, and the present exemplary embodiment is set thus. The array direction of the reinforcing fibers disposed in the shelf portions 92C is set in a direction running along the wavelength direction of the waved plate section 22 (arrow W direction).

An end portion of the shelf portion 92C at the opposite side to the bent portion 26 (26X), and an end portion at the extension portion 78 side of the general portion 92A are integrally coupled together by a coupling portion 92B. The coupling portion 92B is formed substantially parallel to the extension portion 78.

Although not illustrated in the drawings, a press mold for press-molding the panel member 90 includes a lower mold and an upper mold. The lower mold includes a first molding face employed to press-mold the panel member 90. The upper mold includes a second molding face that is disposed facing the upper side of the lower mold and is employed to press-mold the panel member 90. Each region of the second molding face of the upper mold that molds the general portions 28A of the lateral wall portions 28 (28Y), and the general portions 92A and the shelf portions 92C of the lower wall portions 92, is set with a narrower gap to the first molding face of the lower mold than a region of the second molding face that molds the upright wall portions 24. A manufacturing method of the panel member 90 employing such a press mold is performed by a similar sequence to in the first exemplary embodiment.

The configuration of the present exemplary embodiment explained above also obtains similar operation and advantageous effects to those in the first and fourth exemplary embodiments, described above. In the present exemplary embodiment, the flat plate shaped lower panel 14 illustrated in FIG. 13 can be applied instead of the lower panel 16 formed with the recess groove portions 16A as illustrated in FIG. 11 (the fourth exemplary embodiment), thereby enabling the shape of the lower panel 14 to be simplified.

In the present exemplary embodiment, a recess portion 94 that opens downward is formed at each coupling portion 92B between the extension portion 78, the bent portion 26 (26X) and the shelf portion 92C, thereby enabling this recess portion 94 to function as an adhesive accumulation portion. Namely, in cases in which the general portion 92A of the panel member 90 and the lower panel 14 are joined together using adhesive, it is conceivable that excess adhesive oozes out from the adhered portion; however, in the present exemplary embodiment, the adhesive that has oozed out can be accumulated in the recess portion 94. The adhesive is thereby suppressed from oozing out over a wide range.

Supplementary Explanation of Exemplary Embodiments

As a modified example of the above exemplary embodiments, the panel member may, for example, be another panel member such as a panel member with a cross-section profile sectioned along the wavelength direction of the waved plate section formed in a hat shape.

As another modified example of the above exemplary embodiments, the panel member may be configured without being joined to one or both of the upper panel 12 and the lower panel 14, 16 of the above exemplary embodiments.

It is preferable that bubbles are not included in the general portion; however, a configuration in which bubbles with a similar diameter to the reinforcing fibers, or bubbles with a smaller diameter than the reinforcing fibers, are included in the general portion, or a configuration in which bubbles with a very slightly larger diameter than the reinforcing fibers are included in the general portion, may be adopted.

As another modified example of the above exemplary embodiments, the fiber reinforced plastic material applied as the panel member may be a composite material formed by setting reinforcing fibers in thermoset resin. In such cases, the manufacturing method of the panel member is by a sheet molding compound (SMC) process, involving pressing while heating.

Note that the exemplary embodiments and plural modified examples described above may be combined and implemented as appropriate.

Examples of the present invention have been explained above; however, the present invention is not limited thereto, and obviously various other modifications may be implemented within a range not departing from the spirit of the present invention.

The entire contents of the disclosure of Japanese Patent Application No. 2013-140111 are incorporated by reference in the present specification.

The invention claimed is:
1. A panel member, comprising:
first wall portions that form undulations of a waved plate section molded from a fiber reinforced plastic material; and
second wall portions that configure upper and lower end portions in a wave height direction of the waved plate section, and that are connected to the first wall portions by bent portions, wherein:
the second wall portions each include a general portion extending along a wavelength direction of the waved plate section, and the general portions are set with a thinner plate thickness than the first wall portions;
an array direction of reinforcing fibers disposed in the general portions is set in a direction running along the wavelength direction of the waved plate section; and extension portions extend out from the bent portions at an opposite side to a first wall portion side, and the extension portions are integrally formed with the bent portions.

2. A press mold, comprising:
a lower mold that includes a first molding face employed to press-mold the panel member of claim 1; and
an upper mold that is disposed facing an upper side of the lower mold, that includes a second molding face employed to press-mold the panel member, and in which a region of the second molding face that molds the general portions of the second wall portions is set with a narrower gap to the first molding face than a region of the second molding face that molds the first wall portions.

3. A manufacturing method of a panel member employing the press mold of claim 2, the manufacturing method comprising:
a first process in which, in a state in which a fiber reinforced plastic material in sheet form is disposed on the lower mold, the second molding face of the upper mold is brought into relatively close contact with the first molding face of the lower mold, and the fiber reinforced plastic material is formed in a waved plate shape; and
a second process in which, after the first process, the second molding face of the upper mold is brought into relatively even closer contact with the first molding face of the lower mold, and a region that becomes the general portions of the second wall portions is compressed in a general portion plate thickness direction.

4. The panel member of claim 1, wherein the general portion at least does not include bubbles that have a larger diameter than the reinforcing fibers.

5. The panel member of claim 1, wherein:
the bent portions are formed in a curved shape and are set with the same plate thickness as the first wall portions; and
gradual change portions with gradually decreasing plate thickness on progression away from the bent portions are formed at an end portion at a bent portion side of the second wall portions.

6. The panel member of claim 1, wherein:
the bent portions are formed in a curved shape and are set with the same plate thickness as the second wall portions; and
gradual change portions with gradually increasing plate thickness on progression away from the bent portions are formed at an end portion at a bent portion side of the first wall portions.

7. A panel member, comprising:
first wall portions that form undulations of a waved plate section molded from a fiber reinforced plastic material; and
second wall portions that configure upper and lower end portions in a wave height direction of the waved plate section, and that are connected to the first wall portions by bent portions, wherein:
the second wall portions each include a general portion extending along a wavelength direction of the waved plate section, and the general portions are set with a thinner plate thickness than the first wall portions;
the first wall portions are formed perpendicularly to the second wall portions;
an array direction of reinforcing fibers disposed in the general portions is set in a direction running along the wavelength direction of the waved plate section; and
extension portions extend out from the bent portions at an opposite side to a first wall portion side, and the extension portions are integrally formed with the bent portions.

8. A press mold, comprising:
a lower mold that includes a first molding face employed to press-mold the panel member of claim 7; and
an upper mold that is disposed facing an upper side of the lower mold, that includes a second molding face employed to press-mold the panel member, and in which a region of the second molding face that molds the general portions of the second wall portions is set with a narrower gap to the first molding face than a region of the second molding face that molds the first wall portions.

9. A manufacturing method of a panel member employing the press mold of claim 8, the manufacturing method comprising:
a first process in which, in a state in which a fiber reinforced plastic material in sheet form is disposed on the lower mold, the second molding face of the upper mold is brought into relatively close contact with the first molding face of the lower mold, and the fiber reinforced plastic material is formed in a waved plate shape; and
a second process in which, after the first process, the second molding face of the upper mold is brought into relatively even closer contact with the first molding face of the lower mold, and a region that becomes the general portions of the second wall portions is compressed in a general portion plate thickness direction.

10. The panel member of claim 7, wherein the general portion at least does not include bubbles that have a larger diameter than the reinforcing fibers.

11. The panel member of claim 7, wherein:
the bent portions are formed in a curved shape and are set with the same plate thickness as the first wall portions; and
gradual change portions with gradually decreasing plate thickness on progression away from the bent portions are formed at an end portion at a bent portion side of the second wall portions.

12. The panel member of claim 7, wherein:
the bent portions are formed in a curved shape and are set with the same plate thickness as the second wall portions; and
gradual change portions with gradually increasing plate thickness on progression away from the bent portions are formed at an end portion at a bent portion side of the first wall portions.

* * * * *